(12) United States Patent
Wronski et al.

(10) Patent No.: US 12,017,619 B2
(45) Date of Patent: Jun. 25, 2024

(54) ACCESSORY MOUNT ASSEMBLY

(71) Applicant: NRTV COLLAB INC., Orange, CA (US)

(72) Inventors: Luke Benjamin Wronski, Costa Mesa, CA (US); Eric Reed Ichiro Pyle, Orange, CA (US)

(73) Assignee: NRTV Collab Inc., Orange, CA (US)

( * ) Notice: Subject to any disclaimer, the term of this patent is extended or adjusted under 35 U.S.C. 154(b) by 217 days.

(21) Appl. No.: 17/827,111

(22) Filed: May 27, 2022

(65) Prior Publication Data
US 2022/0388454 A1 Dec. 8, 2022

Related U.S. Application Data

(60) Provisional application No. 63/202,241, filed on Jun. 2, 2021.

(51) Int. Cl.
*B60R 9/06* (2006.01)
*B60R 11/00* (2006.01)

(52) U.S. Cl.
CPC ............... *B60R 9/06* (2013.01); *B60R 11/00* (2013.01); *B60R 2011/008* (2013.01)

(58) Field of Classification Search
CPC ...... B60R 9/06; B60R 11/00; B60R 2011/008
USPC ........................................................ 224/519
See application file for complete search history.

(56) References Cited

U.S. PATENT DOCUMENTS

| | | | | |
|---|---|---|---|---|
| 5,186,371 A | * | 2/1993 | Jozefczak | B62D 43/002 414/463 |
| 5,538,168 A | * | 7/1996 | Burger | B62D 43/02 224/42.28 |
| 5,967,389 A | * | 10/1999 | Hutter | B62D 43/02 224/42.21 |
| 7,309,093 B2 | * | 12/2007 | Ward | B60P 3/14 206/349 |
| D598,274 S | | 8/2009 | Nerskov | |
| D606,384 S | | 12/2009 | Antonic | |
| D616,287 S | | 5/2010 | Lavoie | |
| D616,726 S | | 6/2010 | Ziaylek et al. | |
| D618,085 S | | 6/2010 | Lin et al. | |
| D787,916 S | | 5/2017 | Yuan | |
| D787,917 S | | 5/2017 | Kennelly | |
| D796,302 S | | 9/2017 | Bright et al. | |
| D904,171 S | | 12/2020 | Ochi | |

(Continued)

OTHER PUBLICATIONS

SideHack™—RIGd Supply, RIGd, Nov. 22, 2021, https://www.rigdsupply.com/products/sidehack (Year: 2021).

(Continued)

*Primary Examiner* — Peter N Helvey
(74) *Attorney, Agent, or Firm* — Knobbe Martens Olson & Bear LLP

(57) ABSTRACT

An accessory mount assembly for mounting on a supporting structure of or associated with a vehicle. The accessory mount assembly includes a first portion having a first end wall and at least one side wall, a second portion having a second end wall, and a third portion having a plate portion and at least one mounting flange offset from the plate portion. The accessory mount assembly is configured such that, in use, a portion of the supporting structure of or otherwise associated with a vehicle is received between the first end wall and the second end wall.

15 Claims, 4 Drawing Sheets

(56) References Cited

U.S. PATENT DOCUMENTS

| | | | |
|---|---|---|---|
| D920,082 S | | 5/2021 | Kellerman |
| D921,640 S | | 6/2021 | Cheng |
| D966,076 S | | 10/2022 | Charette |
| D973,471 S | | 12/2022 | Tanner et al. |
| D976,681 S | | 1/2023 | Herbertsson |
| D980,776 S | | 3/2023 | Altdorfer |
| D997,695 S | * | 9/2023 | Wronski ............... D12/412 |
| 2008/0047985 A1 | * | 2/2008 | Newbill ............ B62D 43/005 224/42.2 |

OTHER PUBLICATIONS

Rational Cover for Pump, Amazon, Sep. 4, 2014, https://www.amazon.com/Rational-56-00-37 5-Cover-Pump-61-102/dp/B00NBAL2TO (Year: 2014).

Rago Fabrication, UltraPlates, works with Quick Fist System, holes to attach S hooks, No. drilling required, powder coated textured black and more, Mar. 6, 2021. https://www.facebook.com/ragofabrication/photos/a.871338332892617/4462617423764672/?type=3.

\* cited by examiner

ACCESSORY MOUNT ASSEMBLY

BACKGROUND

Field

The present disclosure relates generally to vehicle accessories. In particular, the present disclosure relates to accessory mount assemblies, such as for mounting to an accessory rack.

Description of Related Art

Many types of vehicle accessory mounts are currently in use. However, many such accessory mounts could be improved.

SUMMARY

The systems, methods and devices described herein have innovative aspects, no single one of which is indispensable or solely responsible for their desirable attributes. Without limiting the scope of the claims, some of the advantageous features will now be summarized.

An aspect of the present disclosure involves an accessory mount assembly for mounting on a supporting structure of or otherwise associated with a vehicle. The accessory mount assembly includes a first portion having a first end wall and at least one side wall. The accessory mount assembly also includes a second portion having a second end wall. The accessory mount assembly further includes a third portion having a plate portion and at least one mounting flange offset from the plate portion. The first portion is coupled to the second portion with the at least one sidewall located between the first end wall and the second end wall such that at least a portion of each of the first end wall and the second end wall are spaced apart from one another. The third portion is coupled to one or both of the first portion and the second portion at the at least one mounting flange such that the plate portion is offset from each of the first end wall and the second end wall. The accessory mount assembly is configured such that, in use, a portion of the supporting structure of or otherwise associated with a vehicle is received between the first end wall and the second end wall.

In some configurations, the at least one mounting flange of the third portion rests against the second end wall of the second portion.

In some configurations, the at least one mounting flange comprises a first mounting flange and a second mounting flange.

In some configurations, the first mounting flange and the second mounting flange are on opposite ends of the plate portion from one another.

In some configurations, the first mounting flange and the second mounting flange are the only mounting flanges of the third portion.

In some configurations, the plate portion has a first portion and a second portion that are not located in the same plane as one another.

In some configurations, the plate portion comprises a plurality of mounting openings, which can be but is not limited to slots.

In some configurations, the at least one side wall of the first portion comprises at least one open-ended slot having a circular terminal end configured to receive a tubular portion of the supporting structure that has a circular or part circular cross-sectional shape.

In some configurations, the at least one side wall comprises a first side wall portion and a second side wall portion located opposite one another, wherein the at least one open-ended slot comprises a first open-ended slot located in the first side wall portion and a second open-ended slot located in the second side wall portion.

In some configurations, the at least one side wall of the first portion does not completely surround the first end wall such that the at least one side wall defines at least one open section.

In some configurations, the second portion comprises at least one side wall that occupies the at least one open section.

In some configurations, the at least one open section comprises a first open section and a second open section and the at least one side wall comprises a corresponding first side wall portion and second side wall portion.

In some configurations, each of the first end wall and the second end wall is L-shaped.

In some configurations, one or more, or each, of the first portion, the second portion, and the third portion are constructed from a piece of sheet metal.

In some configurations, the supporting structure is a hitch-mounted swingable accessory rack.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 2:
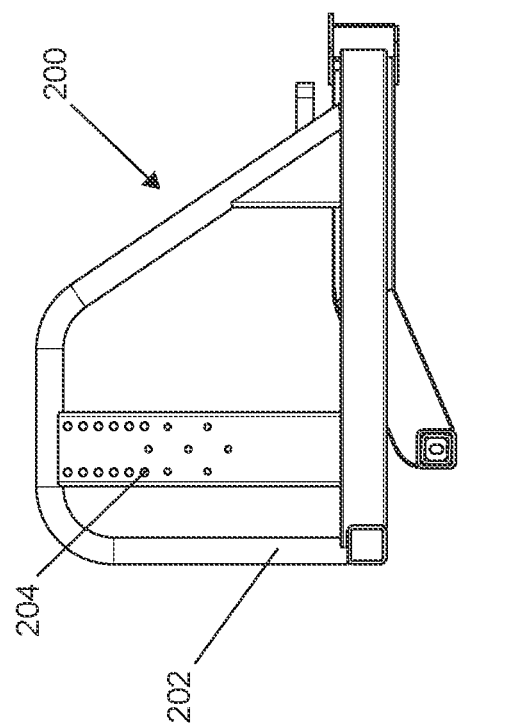
FIG. 2 is a front view of a swingable vehicle accessory rack to which the auxiliary accessory mount assembly of FIG. 1 can be mounted.
Figure 1:
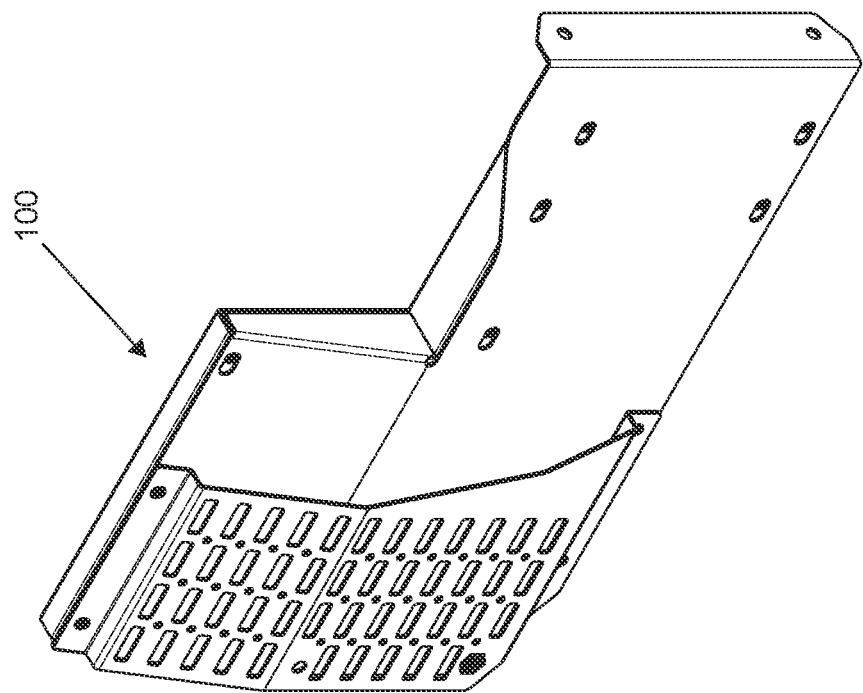
FIG. 1 is a perspective view of an auxiliary accessory mount assembly having certain features, aspects and advantages of preferred embodiments of the disclosure.

Embodiments of systems, components and methods of assembly and manufacture will now be described with reference to the accompanying Figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 3:
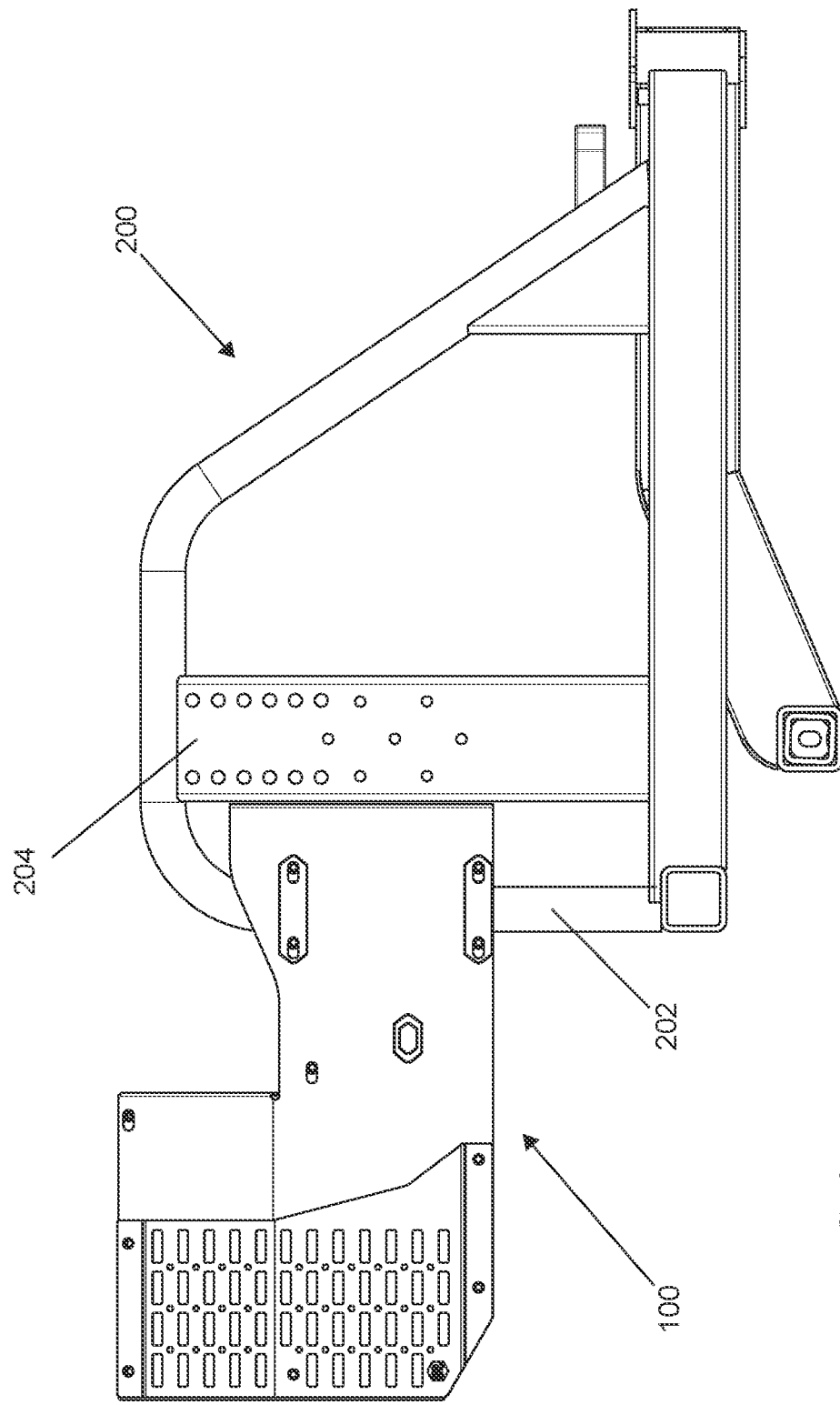
FIG. 3 is a front view of the auxiliary accessory mount assembly of FIG. 1 mounted to the swingable vehicle accessory rack of FIG. 2.

FIGS. 1 and 3-6 illustrate an accessory mount assembly 100 having certain features, aspects, and advantages of the present disclosure. The accessory mount assembly 100 is configured for mounting on a supporting structure of or otherwise associated with a vehicle. In some configurations, as illustrated in FIGS. 2 and 3, the supporting structure is a hitch-mounted swingable accessory rack 200. In some configurations, the hitch-mounted swingable accessory rack 200 is configured to support one or more of a spare tire, a camp table, or one or more fluid containers (e.g., water or fuel), among other possibilities. An example of a hitch-mounted swingable accessory rack 200 is the UltraSwing™ accessory rack sold by the Applicant of the present application, NRTV Collab, Inc., dba RIGd Supply™. The UltraSwing™ accessory rack is described in Applicant's U.S. Patent Publication No. 2020/0114988, the entirety of which is incorporated by reference herein and made a part of the present disclosure. In other configurations, the supporting structure can be another portion of a vehicle or an accessory of a vehicle, such as a truck bed rack, a roof rack, a bicycle rack, a roll bar or cage, among other possibilities.

Figure 4:
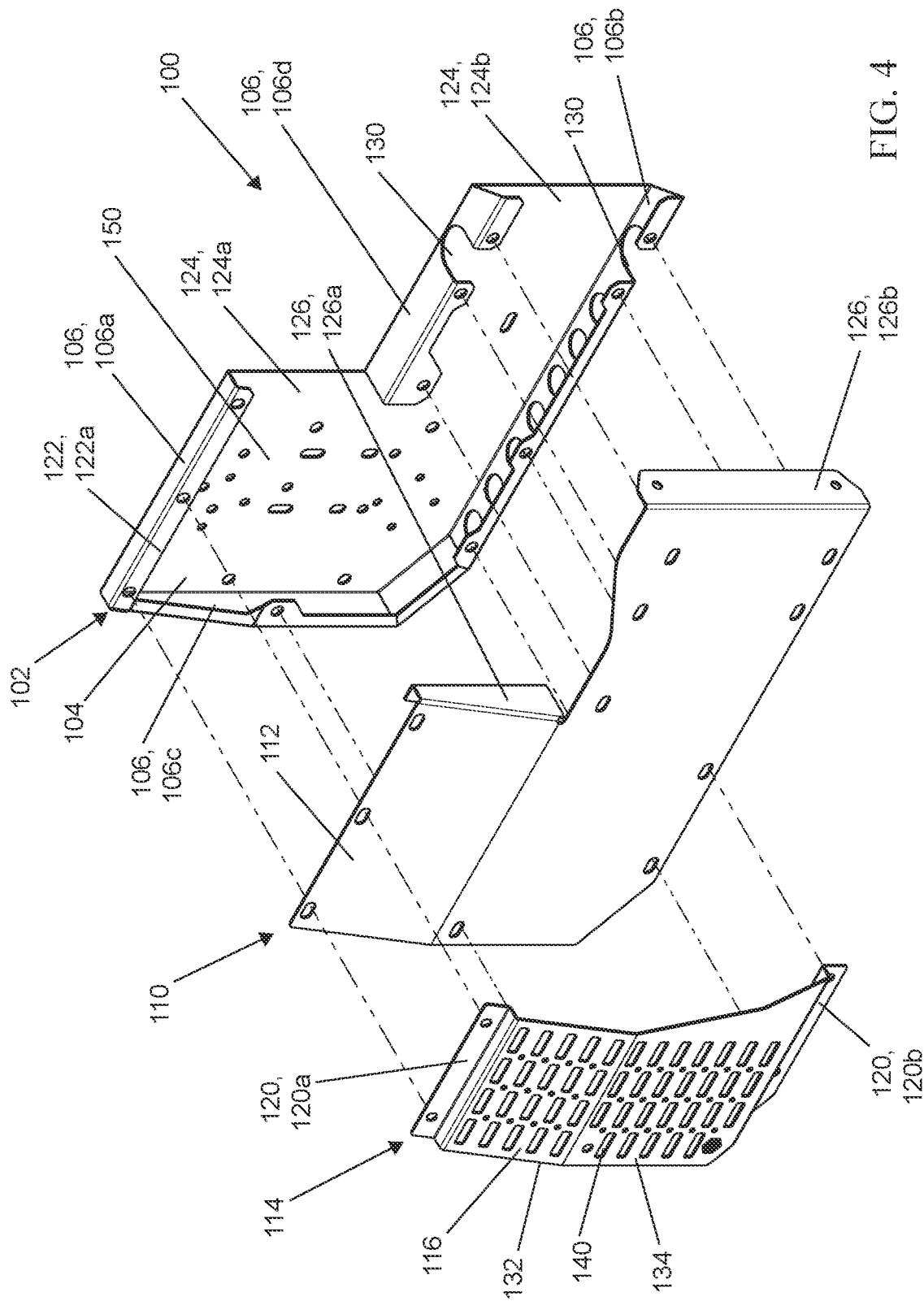
FIG. 4 is a perspective view of the auxiliary accessory mount assembly in an exploded condition to illustrate several individual components.
Figure 6:
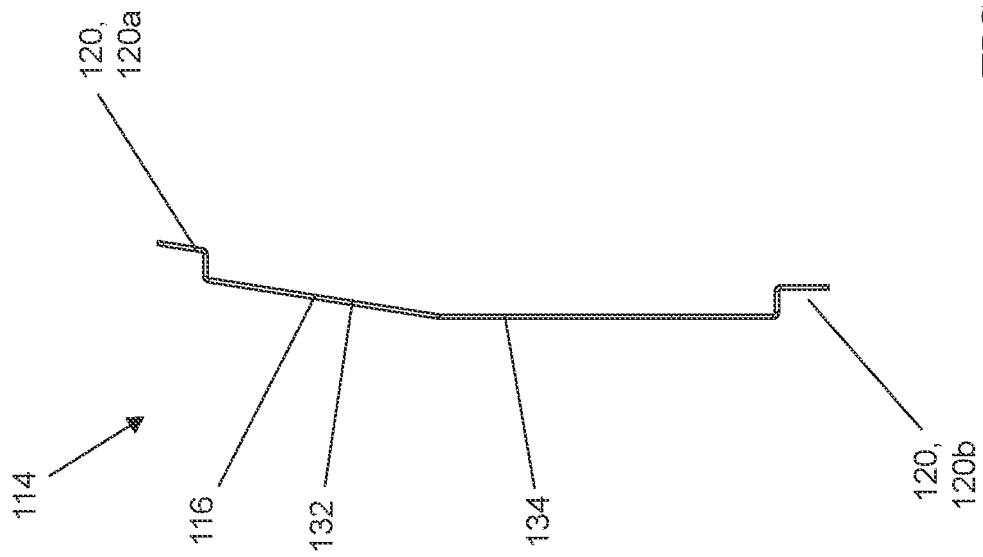
FIG. 6 is a side view of the slotted plate component of FIG. 5.
Figure 5:
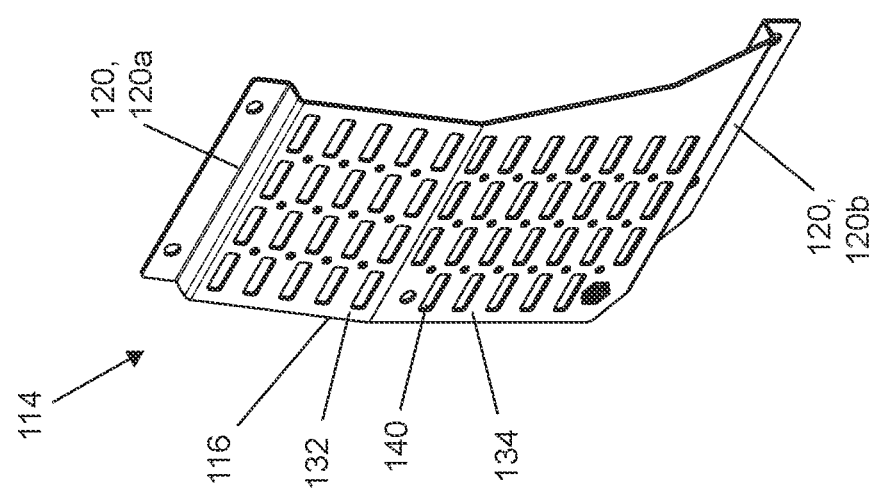
FIG. 5 is a perspective view of a slotted plate component of the auxiliary accessory mount assembly shown separately from the other components of FIG. 4.

With particular reference to FIG. 4, the illustrated accessory mount assembly 100 includes a first portion 102 having a first end wall 104 and at least one side wall 106. The accessory mount assembly 100 also includes a second portion 110 having a second end wall 112. The accessory mount assembly 100 further includes a third portion 114 having a plate portion 116 and at least one mounting flange 120 offset from the plate portion 116.

The first portion 102 is coupled to the second portion 110 with the at least one sidewall 106 located between the first end wall 104 and the second end wall 112 such that at least a portion of each of the first end wall 104 and the second end wall 112 are spaced apart from one another. In the illustrated arrangement, the second portion 110 is coupled directly to a mounting flange 122 that extends inwardly from an edge of the at least one side wall 106. The first portion 102 can be coupled to the second portion 110 by any suitable arrangement, such as by one or more fasteners (e.g., screws). In some configurations, each of the first end wall 104 and the second end wall 112 is L-shaped.

The third portion 114 is coupled to one or both of the first portion 102 and the second portion 110 at the at least one mounting flange 120 such that the plate portion 116 is offset from each of the first end wall 104 and the second end wall 112. In the illustrated arrangement, the second end wall 112 is positioned between the first end wall 104 and the plate portion 116. The at least one mounting flange 120 of the third portion 114 rests against the second end wall 112 of the second portion 110.

In the illustrated arrangement, the at least one mounting flange 120 comprises a first mounting flange 120a and a second mounting flange 120b. In some configurations, the first mounting flange 120a and the second mounting flange 120b are on opposite ends of the plate portion 116 from one another. In the illustrated arrangement, the first mounting flange 120a is located at an upper end of the plate portion 116 and the second mounting flange 120b is located at a lower end of the plate portion 116.

In some configurations, the first mounting flange 120a and the second mounting flange 120b are the only mounting flanges of the third portion 114. That is, in the illustrated arrangement, the sides of the plate portion 116 do not include mounting flanges. Such an arrangement allows access to a rearward side of the plate portion 116. However, in other arrangements, the mounting flange 120 can extend around three or more sides (or the entire periphery) of the plate portion 116.

In some configurations, the at least one side wall 106 of the first portion 102 does not completely surround the first end wall 104 such that the at least one side wall 106 defines at least one open section 124. The second portion 110 can include at least one side wall 126 that occupies the at least one open section 124. In some configurations, the at least one open section 124 comprises a first open section 124a and a second open section 124b and the at least one side wall 126 comprises a corresponding first side wall portion 126a and second side wall portion 126b. However, in some configurations, either or both of the first portion 102 and the second portion 110 can include a partial or complete side wall.

The accessory mount assembly 100 is configured such that, in use, a portion of the supporting structure of or otherwise associated with a vehicle is received between the first end wall 104 and the second end wall 112. In some configurations, the at least one side wall 106 of the first portion 102 comprises at least one open-ended slot 130 having a circular terminal end configured to receive a tubular portion of the supporting structure that has a circular or part circular cross-sectional shape. In particular, the slot 130 is configured to receive a vertical strut or frame member 202 of the hitch-mounted swingable accessory rack 200. In some configurations, the second side wall portion 126b can be a mounting flange that can be connected to a portion of the hitch-mounted swingable accessory rack 200, such as a vertical mount portion or rail 204.

In some configurations, the at least one side wall 106 comprises at least a first side wall portion 106a and a second side wall portion 106b located opposite one another. The at least one open-ended slot 130 comprises a first open-ended slot 130a located in the first side wall portion 106a and a second open-ended slot 130b located in the second side wall portion 106b. In the illustrated arrangement, the at least one side wall 106 also includes a third side wall portion 106c and a fourth side wall portion 106d.

In some configurations, the plate portion 116 has a first portion 132 and a second portion 134 that are not located in the same plane as one another. In other words, the first portion 132 and the second portion 134 are angled relative to one another. In some configurations, an upper portion of the second end wall 112 is angled similarly to the second portion 134 of the plate portion 116.

In some configurations, the plate portion 116 comprises a plurality of mounting openings 140, which can be but are not limited to slots. The plurality of mounting openings 140 can allow objects to be mounted to the plate portion 116, such as via mechanical fasteners, straps, cable ties, etc. passing through the openings 140. With reference to FIG. 4, the first end wall 104 can also be configured to provide for the mounting of additional objects, such as a fluid container mount 150 (e.g., containers and mounts sold under the brand name Rotopax™).

In some configurations, one or more, or each, of the first portion 102, the second portion 110, and the third portion 114 are constructed from a piece of sheet metal. The sheet metal workpiece can be cut, bent or otherwise formed into the desired final shape. The workpiece can be treated (e.g., powder coated or painted) to have any desired final appearance or surface characteristics.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. An accessory mount assembly for mounting on a supporting structure of or otherwise associated with a vehicle, the accessory mount assembly comprising:
   a first portion comprising a first end wall and at least one side wall;
   a second portion comprising a second end wall;
   a third portion comprising a plate portion and at least one mounting flange offset from the plate portion;
   wherein the first portion is coupled to the second portion with the at least one sidewall located between the first end wall and the second end wall such that at least a portion of each of the first end wall and the second end wall are spaced apart from one another;
   wherein the third portion is coupled to one or both of the first portion and the second portion at the at least one mounting flange such that the plate portion is offset from each of the first end wall and the second end wall;
   wherein the accessory mount assembly is configured such that, in use, a portion of the supporting structure is received between the first end wall and the second end wall.

2. The accessory mount assembly of claim 1, wherein the at least one mounting flange of the third portion rests against the second end wall of the second portion.

3. The accessory mount assembly of claim 2, wherein the at least one mounting flange comprises a first mounting flange and a second mounting flange.

4. The accessory mount assembly of claim 3, wherein the first mounting flange and the second mounting flange are on opposite ends of the plate portion from one another.

5. The accessory mount assembly of claim 4, wherein the first mounting flange and the second mounting flange are the only mounting flanges of the third portion.

6. The accessory mount assembly of claim 1, wherein the plate portion has a first portion and a second portion that are not located in the same plane as one another.

7. The accessory mount assembly of claim 1, wherein the plate portion comprises a plurality of mounting openings, which can be but is not limited to slots.

8. The accessory mount assembly of claim 1, wherein the at least one side wall of the first portion comprises at least one open-ended slot having a circular terminal end configured to receive a tubular portion of the supporting structure that has a circular or part circular cross-sectional shape.

9. The accessory mount assembly of claim 8, wherein the at least one side wall comprises a first side wall portion and a second side wall portion located opposite one another, wherein the at least one open-ended slot comprises a first open-ended slot located in the first side wall portion and a second open-ended slot located in the second side wall portion.

10. The accessory mount assembly of claim 1, wherein the at least one side wall of the first portion does not completely surround the first end wall such that the at least one side wall defines at least one open section.

11. The accessory mount assembly of claim 10, wherein the second portion comprises at least one side wall that occupies the at least one open section.

12. The accessory mount assembly of claim 11, wherein the at least one open section comprises a first open section and a second open section and the at least one side wall comprises a corresponding first side wall portion and second side wall portion.

13. The accessory mount assembly of claim 1, wherein each of the first end wall and the second end wall is L-shaped.

14. The accessory mount assembly of claim 1, wherein one or more, or each, of the first portion, the second portion, and the third portion are constructed from a piece of sheet metal.

15. The accessory mount assembly of claim 1, further comprising the supporting structure, wherein the supporting structure is a hitch-mounted swingable accessory rack.

* * * * *